(12) United States Patent
Tsuji (10) Patent No.: US 10,365,368 B2
(45) Date of Patent: Jul. 30, 2019

(54) OBJECT DETECTING DEVICE (71) Applicant: Panasonic Intellectual Property Management Co., Ltd., Osaka (JP)

(72) Inventor: Takashi Tsuji, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/082,319

(22) PCT Filed: Feb. 15, 2017

(86) PCT No.: PCT/JP2017/005494
§ 371 (c)(1),
(2) Date: Sep. 5, 2018

(87) PCT Pub. No.: WO2017/159187
PCT Pub. Date: Sep. 21, 2017

(65) Prior Publication Data
US 2019/0079187 A1 Mar. 14, 2019

(30) Foreign Application Priority Data
Mar. 15, 2016 (JP) .................................. 2016-051359

(51) Int. Cl.
*G01S 15/93* (2006.01)
*G01S 7/52* (2006.01)
(Continued)

(52) U.S. Cl.
CPC .......... *G01S 15/931* (2013.01); *B06B 1/0215* (2013.01); *B06B 1/0607* (2013.01);
(Continued)

(58) Field of Classification Search
CPC ............. G01S 15/931; G01S 2015/938; B06B 1/0215; B06B 1/0607
(Continued)

(56) References Cited

U.S. PATENT DOCUMENTS 4,551,722 A * 11/1985 Tsuda .................... G01S 15/931
340/901
9,575,179 B2 * 2/2017 Fukuman .............. G01S 15/931
(Continued)

FOREIGN PATENT DOCUMENTS

JP 2004-343482 12/2004

OTHER PUBLICATIONS

International Search Report of PCT application No. PCT/JP2017/005494 dated Apr. 4, 2017.

*Primary Examiner* — Hirdepal Singh
(74) *Attorney, Agent, or Firm* — Greenblum & Bernstein, P.L.C.

(57) ABSTRACT

An object detecting device includes a detector and a determination unit. The detector detects presence or absence of an object based on whether a receiving unit that converts a mechanical vibration into an electric signal receives a reflected ultrasonic wave transmitted intermittently from a transmitting unit. The determination unit determines that the transmitting unit is normal when the electric signal is not detected in a determination section set within a predetermined time from a starting time point of the transmission of the ultrasonic wave. The determination unit determines that the transmitting unit is abnormal when a correlation value of waveforms of a plurality of electric signals detected in the plurality of determination sections is greater than or equal to a specified value. The determination unit determines that the transmitting unit is normal when the correlation value is less than the specified value.

8 Claims, 6 Drawing Sheets (51) Int. Cl.
    *G01S 7/526*  (2006.01)
    *B06B 1/02*   (2006.01)
    *B06B 1/06*   (2006.01)

(52) U.S. Cl.
    CPC ................ *G01S 7/52* (2013.01); *G01S 7/526*
           (2013.01); *G01S 15/93* (2013.01); *G01S*
                                  *2015/938* (2013.01)

(58) Field of Classification Search
    USPC ........................................................ 340/435
    See application file for complete search history.

(56) References Cited

U.S. PATENT DOCUMENTS

| | | | |
|---|---|---|---|
| 2004/0226378 A1 | 11/2004 | Oda et al. | |
| 2009/0207006 A1* | 8/2009 | Richter | G01S 7/52004 |
| | | | 340/435 |
| 2013/0283916 A1* | 10/2013 | Hersey | G01N 29/11 |
| | | | 73/587 |
| 2014/0355385 A1* | 12/2014 | Inagaki | G01S 15/02 |
| | | | 367/99 |
| 2016/0245905 A1* | 8/2016 | Watanabe | G01S 7/52049 |
| 2018/0271478 A1* | 9/2018 | Kozai | A61B 8/12 |

\* cited by examiner

OBJECT DETECTING DEVICE

This application is a U.S. national stage application of the PCT International Application No. PCT/JP2017/005494 filed on Feb. 15, 2017, which claims the benefit of foreign priority of Japanese patent application No. 2016-051359 filed on Mar. 15, 2016, the contents all of which are incorporated herein by reference.

TECHNICAL FIELD

The present invention relates to an object detecting device.

BACKGROUND ART

Conventionally, an ultrasonic sensor that detects an obstacle using an ultrasonic wave has been known (for example, see PTL 1). An ultrasonic sensor described in PTL 1 includes a piezoelectric vibrator (a transmitting unit and a receiving unit), a plurality of switches, a drive circuit, an output signal processing circuit, and a microcomputer. The piezoelectric vibrator transmits the ultrasonic wave according to a drive signal output from the drive circuit, and receives a reflected wave from the obstacle. The output signal processing circuit senses a reverberation time based on a received signal acquired by the piezoelectric vibrator, and outputs a control signal according to a sensing result. The microcomputer on-off drives the plurality of switches based on the control signal from the output signal processing circuit, and adjusts the reverberation time.

CITATION LIST

Patent Literature

PTL 1: Unexamined Japanese Patent Publication No. 2004-343482

SUMMARY OF THE INVENTION

An object of the present invention is to provide an object detecting device that can detect an abnormality of a transmitting unit.

According to a first aspect of the present invention, an object detecting device includes a detector and a determination unit. The detector detects presence or absence of an object based on whether a receiving unit that converts a mechanical vibration into an electric signal receives a reflected ultrasonic wave transmitted intermittently from a transmitting unit. The determination unit determines that the transmitting unit is normal when the electric signal of the reflected ultrasonic wave is not detected in a plurality of determination sections each of which is set within a predetermined time from a starting time point of the transmission of the ultrasonic wave, the determination unit determines that the transmitting unit is abnormal when a correlation value of waveforms of a plurality of the electric signals detected in each of the plurality of determination sections is greater than or equal to a specified value, and the determination unit determines that the transmitting unit is normal when the correlation value is less than the specified value.

According to a second aspect of the present invention, the object detecting device according to the first aspect further includes an information unit that informs a user about abnormality of the transmitting unit based on a determination result of the determination unit.

According to a third aspect of the present invention, in the object detecting device according to the first or second aspect, the determination unit compares an amplitude of the electric signal to a reference value in each of the plurality of determination sections, and determines that the correlation value is greater than or equal to the specified value when the amplitude is greater than or equal to the reference value over a whole of the plurality of determination sections.

According to a fourth aspect of the present invention, in the object detecting device according to any one of the first to third aspects, the determination unit causes the transmitting unit to stop the transmission of the ultrasonic wave when the transmitting unit is determined to be abnormal.

According to a fifth aspect of the present invention, in the object detecting device according to any one of the first to third aspects, the determination unit cancels the determination that the transmitting unit is abnormal when the correlation value is less than the specified value in two adjacent determination sections of the plurality of determination sections while the transmitting unit is determined to be abnormal.

According to a sixth aspect of the present invention, in the object detecting device according to any one of the first to fifth aspects, the detector determines that the object is present when the reflected wave is successively received in a plurality of detecting sections in which the plurality of detecting sections are more than the plurality of determination sections.

According to a seventh aspect of the present invention, in the object detecting device according to any one of the first to sixth aspects, the starting point of each of the plurality of determination section is a time point when a specified time elapses from an ending point of the transmission of the ultrasonic wave.

The object detecting device of the present invention can detect the abnormality of the transmitting unit.

DESCRIPTION OF EMBODIMENT

A problem in a conventional device will briefly be described prior to the description of an exemplary embodiment of the present invention. The abnormality of the piezoelectric vibrator cannot be detected in the ultrasonic sensor described in PTL 1.

The following exemplary embodiment relates to an object detecting device, particularly to an object detecting device that detects an object using an ultrasonic wave.

Figure 1:
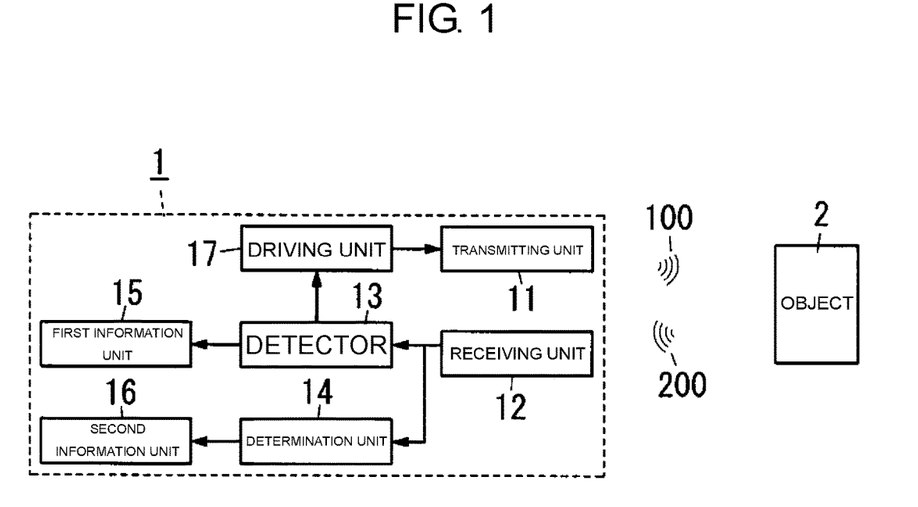
FIG. 1 is a block diagram illustrating an object detecting device according to an exemplary embodiment of the present invention.

As illustrated in FIG. 1, object detecting device 1 of the exemplary embodiment includes detector 13 and determination unit 14. Detector 13 detects presence or absence of object 2 based on whether receiving unit 12 that converts a mechanical vibration into an electric signal receives reflected wave 200 of ultrasonic wave 100 transmitted intermittently from transmitting unit 11. Determination unit 14 determines that transmitting unit 11 is normal when the electric signal is not detected in determination sections T21, T22, T23 (see FIG. 5) set within a predetermined time from a starting time point of the transmission of ultrasonic wave 100. Determination unit 14 determines that transmitting unit 11 is abnormal when a correlation value of waveforms (output waveforms W2) (see FIG. 5) of a plurality of electric signals detected in the plurality of determination sections T21, T22, T23 is greater than or equal to a specified value. Determination unit 14 determines that transmitting unit 11 is normal when the correlation value is less than the specified value.

Hereinafter, object detecting device 1 of the exemplary embodiment of the present invention will specifically be described with reference to the drawings. However, the following configuration is only by way of example of the present invention, and the present invention is not limited to the exemplary embodiment. Besides the exemplary embodiment, the present invention can be changed in various manners according to design and the like without departing from the technical idea of the present invention.

Figure 2A:
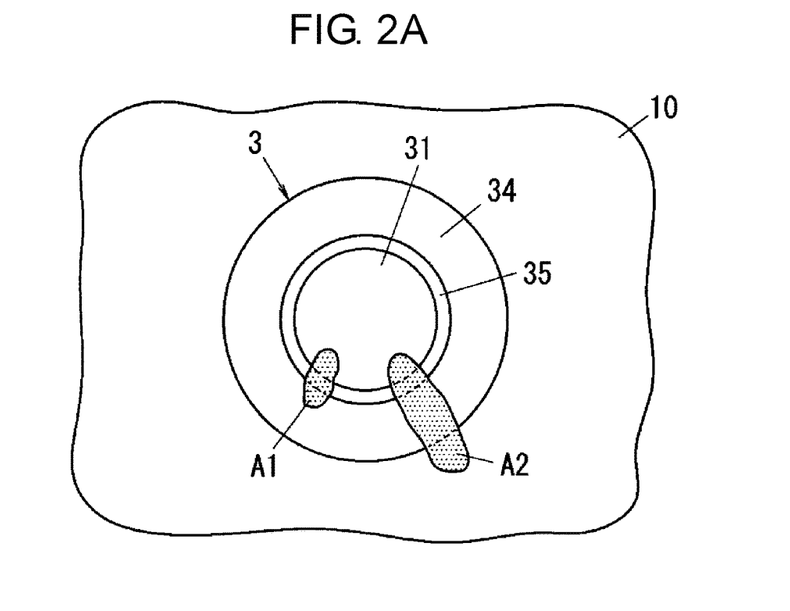
FIG. 2A is a front view in a state in which an ultrasonic sensor used for the object detecting device is mounted on a bumper of a vehicle.
Figure 2B:
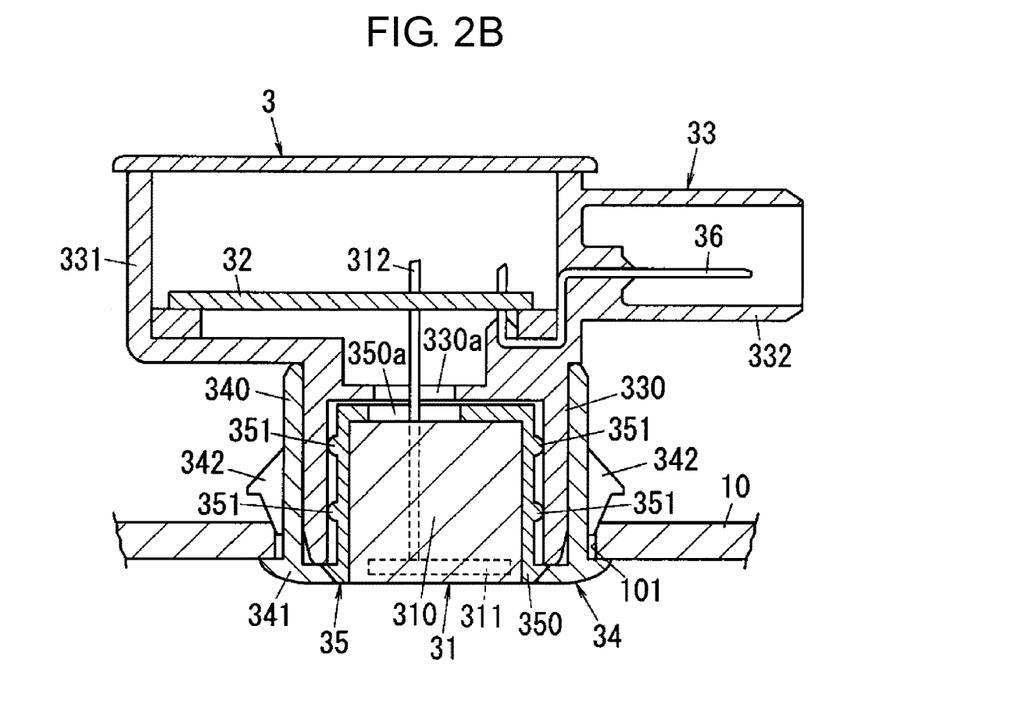
FIG. 2B is a sectional view in the state in which the ultrasonic sensor used for the object detecting device is mounted on the bumper of the vehicle.

As illustrated in FIG. 1, object detecting device 1 of the exemplary embodiment includes transmitting unit 11, receiving unit 12, detector 13, determination unit 14, first information unit 15, second information unit 16, and driving unit 17. As illustrated in FIGS. 2A and 2B, object detecting device 1 is used to detect object 2 located around a vehicle based on a reception result (output result) of ultrasonic sensor 3 attached to, for example, bumper 10 of the vehicle.

Transmitting unit 11 is configured to convert the electric signal into the mechanical vibration. In the exemplary embodiment, transmitting unit 11 vibrates by a predetermined drive signal output from driving unit 17, and transmits (wave-transmits) ultrasonic wave 100 by vibrating air. At this point, in the exemplary embodiment, transmitting unit 11 transmits ultrasonic wave 100 at constant intervals according to the drive signal from driving unit 17. That is, transmitting unit 11 intermittently transmits ultrasonic wave 100.

Receiving unit 12 is configured to convert the mechanical vibration into the electric signal. In the exemplary embodiment, receiving unit 12 receives (wave-receives) reflected wave 200 reflected by object 2 in ultrasonic wave 100 transmitted from transmitting unit 11, and converts received reflected wave 200 into the electric signal. Receiving unit 12 outputs the converted electric signal to detector 13 and determination unit 14.

First information unit 15 is configured to inform when detector 13 detects object 2. For example, first information unit 15 includes a lamp or a buzzer to inform a user, using light or sound. In the exemplary embodiment, the user is a driver or a passenger of the vehicle. In the exemplary embodiment, first information unit 15 is an indicator mounted on the vehicle.

Second information unit (information unit) 16 is configured to inform when determination unit 14 detects the abnormality of transmitting unit 11. Similarly to first information unit 15, for example, second information unit 16 includes a lamp or a buzzer to inform a user, using light or sound. In the exemplary embodiment, second information unit 16 is also the indicator mounted on the vehicle.

In the exemplary embodiment, first information unit 15 and second information unit 16 are provided separately from each other. However, the information unit may be one. That is, the same information unit may be configured to inform both when detector 13 detects object 2 and when determination unit 14 detects that transmitting unit 11 is abnormal.

For example, detector 13 and determination unit 14 are mainly constructed with a microcomputer. The microcomputer implements functions of detector 13 and determination unit 14 by executing a program recorded in a memory using a Central Processing Unit (CPU). The program may previously be recorded in the memory of the microcomputer, or the program may be distributed while recorded in a recording medium such as a memory card, or provided through an electric communication line. In the exemplary embodiment, detector 13 and determination unit 14 are constructed with an Electronic Control Unit (ECU) mounted on the vehicle.

Detector 13 detects the presence or absence of object 2 based on output waveform W2 (to be described later) of receiving unit 12. Detector 13 detects a distance to object 2 based on time until receiving unit 12 receives reflected wave 200 since transmitting unit 11 transmits ultrasonic wave 100. Detecting operation of detector 13 will be described later.

Determination unit 14 determines whether transmitting unit 11 is abnormal based on output waveform W2 of receiving unit 12. Determination operation of determination unit 14 will be described later.

When receiving a transmission starting command starting the transmission of ultrasonic wave 100 from detector 13, driving unit 17 outputs the predetermined drive signal based on the transmission starting command, and causes transmitting unit 11 to start the transmission of ultrasonic wave 100. When receiving a transmission stopping command stopping the transmission of ultrasonic wave 100 from detector 13, driving unit 17 stops the output of the drive signal based on the transmission stopping command, and causes transmitting unit 11 to stop the transmission of ultrasonic wave 100.

As illustrated in FIGS. 2A and 2B, ultrasonic sensor 3 includes ultrasonic transducer 31, circuit board 32, housing 33, bezel 34, and buffering rubber 35.

Ultrasonic transducer 31 includes case 310, piezoelectric element 311, and a pair of connection terminals 312 (only one of connection terminals 312 is illustrated in FIG. 2B). For example, case 310 is formed into a cylindrical shape using a metal material such as aluminum. Case 310 is not limited to the metal material, but may be made of a synthetic resin. Piezoelectric element 311 is housed in case 310. Each of the pair of connection terminals 312 has a rod shape that is long in a thickness direction of circuit board 32, and electrically connects piezoelectric element 311 and circuit board 32.

Piezoelectric element 311 is configured to be able to perform both the transmission of ultrasonic wave 100 and the reception of reflected wave 200 by mutually converting the electric signal (AC voltage) and the mechanical vibration. Piezoelectric element 311 vibrates case 310 when the drive signal is applied from driving unit 17 formed on circuit board 32. Consequently, air is vibrated to generate ultrasonic wave 100. When case 310 is vibrated by reflected wave 200 reflected by object 2 in ultrasonic wave 100, piezoelectric element 311 converts the vibration into the electric signal, and outputs the converted electric signal to circuit board 32. That is, piezoelectric element 311 has a function as transmitting unit 11 that converts the electric signal into the mechanical vibration (ultrasonic wave 100) and a function as receiving unit 12 that converts the mechanical vibration (reflected wave 200) into the electric signal. In other words, in the exemplary embodiment, piezoelectric element 311 constitutes transmitting unit 11 and receiving unit 12.

For example, circuit board 32 is a printed circuit board formed into a rectangular flat plate shape. A circuit component constituting at least driving unit 17 is mounted on circuit board 32. A plurality of connection terminals 36 (only one connection terminal 36 is illustrated in FIG. 2B) electrically connecting circuit board 32 and an external circuit (the ECU in the exemplary embodiment) are electrically connected to circuit board 32. Power is supplied from the ECU to circuit board 32 through the plurality of connection terminals 36, and the circuit board 32 outputs the electric signal (output waveform W2 of receiving unit 12) that is the reception result of piezoelectric element 311 to the ECU.

For example, housing 33 is a synthetic resin molded article. As illustrated in FIG. 2B, housing 33 includes cylindrical first enclosure 330 in which one surface (a bottom surface of first enclosure 330 in FIG. 2B) is opened, box-shaped second enclosure 331, and cylindrical third enclosure 332 in which one surface (a right surface third enclosure 332 in FIG. 2B) is opened. Through-hole 330a is made in a bottom of first enclosure 330 in order to put the pair of connection terminals 312 through, and an inner space of first enclosure 330 and an inner space of second enclosure 331 communicate with each other by through-hole 330a. As illustrated in FIG. 2B, ultrasonic transducer 31 is accommodated in first enclosure 330. Circuit board 32 is housed in second enclosure 331. As illustrated in FIG. 2B, the plurality of connection terminals 36 are disposed across the inner space of second enclosure 331 and the inner space of third enclosure 332. One ends of the plurality of connection terminals 36 are electrically connected to circuit board 32 housed in second enclosure 331. The other ends of the plurality of connection terminals 36 are disposed so as to face an opening of third enclosure 332. A connector provided at a leading end of an electric cable electrically connected to the ECU of the vehicle is connected to third enclosure 332, and the ECU and circuit board 32 are electrically connected to each other through the electric cable.

For example, bezel 34 is a synthetic resin molded article. Bezel 34 includes cylindrical main body 340 in which both ends are opened. Flange 341 is provided over an entire circumference at one (a lower side of main body 340 in FIG. 2B) of opening edges of main body 340. A plurality of protrusions 342 are provided on an outer circumferential surface of main body 340. Each of the plurality of protrusions 342 can be bent in a direction (a horizontal direction in FIG. 2B) orthogonal to a direction (a vertical direction in FIG. 2B) of a central axis of ultrasonic transducer 31.

Buffering rubber 35 includes cylindrical main body 350 in which one surface (a bottom surface of main body 350 in FIG. 2B) is opened. Through-hole 350a is made in a bottom of main body 350 in order to put the pair of connection terminals 312 through. A plurality of protrusions 351 protruding outward are provided on an outer circumferential surface of main body 350. Buffering rubber 35 is disposed between case 310 of ultrasonic transducer 31 and first enclosure 330 of housing 33 such that the vibration of the vehicle during running is not transmitted to ultrasonic transducer 31.

A procedure for attaching ultrasonic sensor 3 to bumper 10 will be described below. In the following description, it is assumed that ultrasonic transducer 31, circuit board 32, and buffering rubber 35 are previously assembled in housing 33.

First, a worker attaches bezel 34 to bumper 10 by inserting main body 340 of bezel 34 in through-hole 101 made in bumper 10 of the vehicle. When main body 340 is inserted to a position where the plurality of protrusions 342 contact with an opening edge of through-hole 101, the plurality of protrusions 342 are bent inward (an orientation toward the center of through-hole 101). Then, when main body 340 is inserted to a position where flange 341 contacts with a surface of bumper 10, the plurality of protrusions 342 move outward by elastic force. As a result, bumper 10 is sandwiched between flange 341 and the plurality of protrusions 342 to attach bezel 34 to bumper 10. Then, the worker assembles housing 33 in bezel 34 by inserting first enclosure 330 of housing 33 in main body 340 of bezel 34. At this point, housing 33 is attached to bezel 34 by fitting a projection provided in one of first enclosure 330 and main body 340 in a recess provided in the other.

Figure 3A:
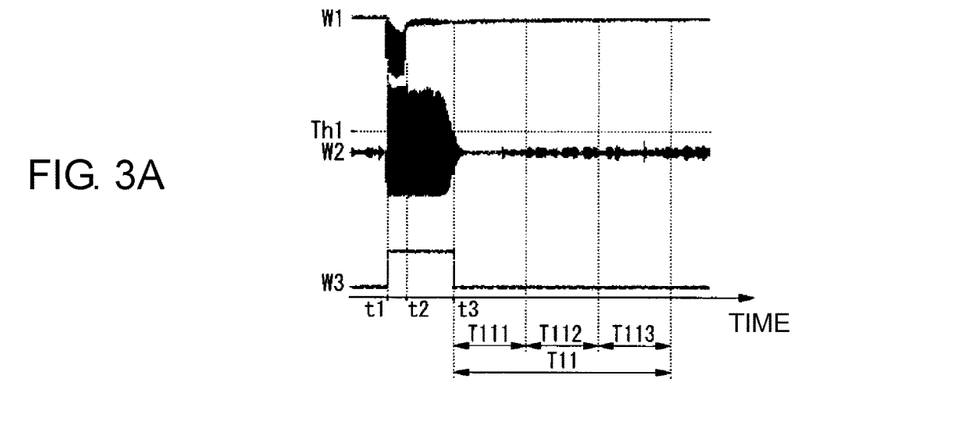
FIG. 3A is an ultrasonic waveform chart in the object detecting device.
Figure 3B:
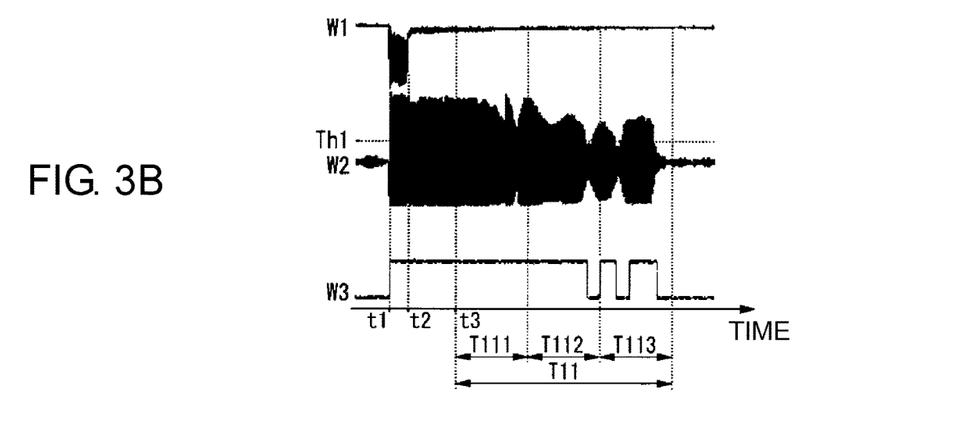
FIG. 3B is an ultrasonic waveform chart in the object detecting device.
Figure 3C:
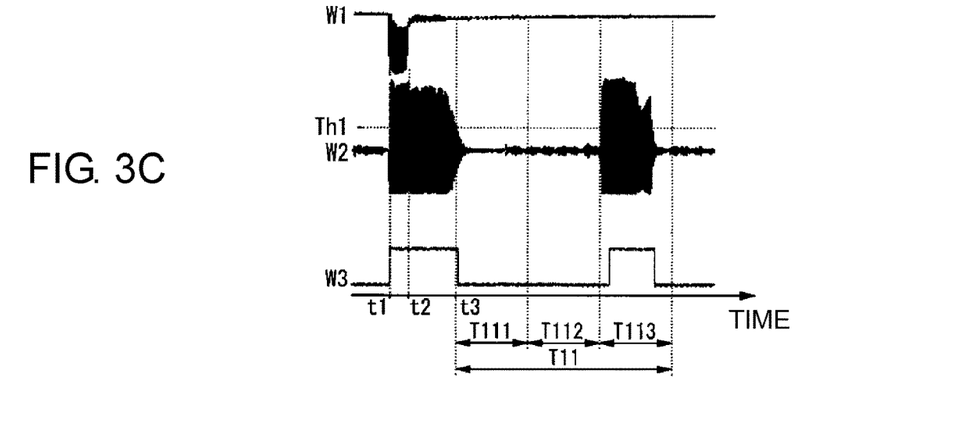
FIG. 3C is an ultrasonic waveform chart in the object detecting device.

FIGS. 3A to 3C are waveform charts of object detecting device 1 of the exemplary embodiment. "W1" in FIGS. 3A to 3C expresses an output waveform of transmitting unit 11. "W2" in FIGS. 3A to 3C expresses an output waveform of receiving unit 12. That is, "W2" is a waveform of the electric signal into which receiving unit 12 converts reflected wave 200. "W3" in FIGS. 3A to 3C expresses a digital waveform in which analog-digital (A/D) conversion is performed on output waveform W2. Digital waveform W3 becomes high when an amplitude of output waveform W2 is greater than or equal to reference value Th1, and digital waveform W3 becomes low when the amplitude is less than reference value Th1.

FIG. 3A is a waveform chart in the case that object 2 is not detected. Transmitting unit 11 starts the transmission of ultrasonic wave 100 at time t1, and stops the transmission of ultrasonic wave 100 at time t2. That is, transmitting unit 11 transmits ultrasonic wave 100 only in a section from time t1 to time t2 (see output waveform W1). On the other hand, receiving unit 12 receives ultrasonic wave 100 transmitted from transmitting unit 11 in the section from time t1 to time t2, and outputs the electric signal corresponding to ultrasonic wave 100 (see output waveform W2). At this point, ultrasonic transducer 31 of the exemplary embodiment has a structure in which ultrasonic wave 100 is generated by the vibration, and ultrasonic transducer 31 still vibrates after the transmission of ultrasonic wave 100 is stopped (hereinafter, referred to as a reverberation). Consequently, receiving unit 12 receives ultrasonic wave 100 of the reverberation in the section from time t2 to time t3, and outputs the electric signal corresponding to ultrasonic wave 100. The amplitude of output waveform W2 is greater than or equal to reference value Th1 over the section from time t1 to time t3, so that digital waveform W3 is high in the section from time t1 to time t3.

At this point, in object detecting device 1 of the exemplary embodiment, detecting section T11 in which time t3 the reverberation is ended is set to a starting point is set as a detecting section in which detector 13 detects the presence or absence of object 2. Detecting section T11 is divided into short-distance section T111 in which object 2 located in a short distance is detected, intermediate-distance section T112 in which object 2 located in an intermediate distance is detected, and long-distance section T113 in which object 2 located in a long distance is detected. Detector 13 can estimate the distance to object 2 based on which section reflected wave 200 is received in. In the example of FIG. 3A, detector 13 determines that reflected wave 200 is not received in any of short-distance section T111, intermediate-distance section T112, and long-distance section T113 because digital waveform W3 is low over entire detecting section T1. Detector 13 determines that object 2 is absent because reflected wave 200 is not received in any of short-distance section T111, intermediate-distance section T112, and long-distance section T11.

FIG. 3B is a waveform chart in the case that object 2 is detected. In this case, detector 13 determines that reflected wave 200 is received in short-distance section T111 because digital waveform W3 becomes high in short-distance section T111. Detector 13 determines that object 2 is present in the short distance because reflected wave 200 is received in short-distance section T111. The section from time t1 to time t3 is similar to that in FIG. 3A, so that the description will be omitted.

FIG. 3C is another waveform chart in the case that object 2 is detected. In this case, digital waveform W3 is low in short-distance section T111 and intermediate-distance section T112, and digital waveform W3 is high in long-distance section T113, so that detector 13 determines that reflected wave 200 is received in long-distance section T113. Detector 13 determines that object 2 is present in the long distance because reflected wave 200 is received in long-distance section T113. The section from time t1 to time t3 is similar to that in FIG. 3A, so that the description will be omitted.

Figure 4:
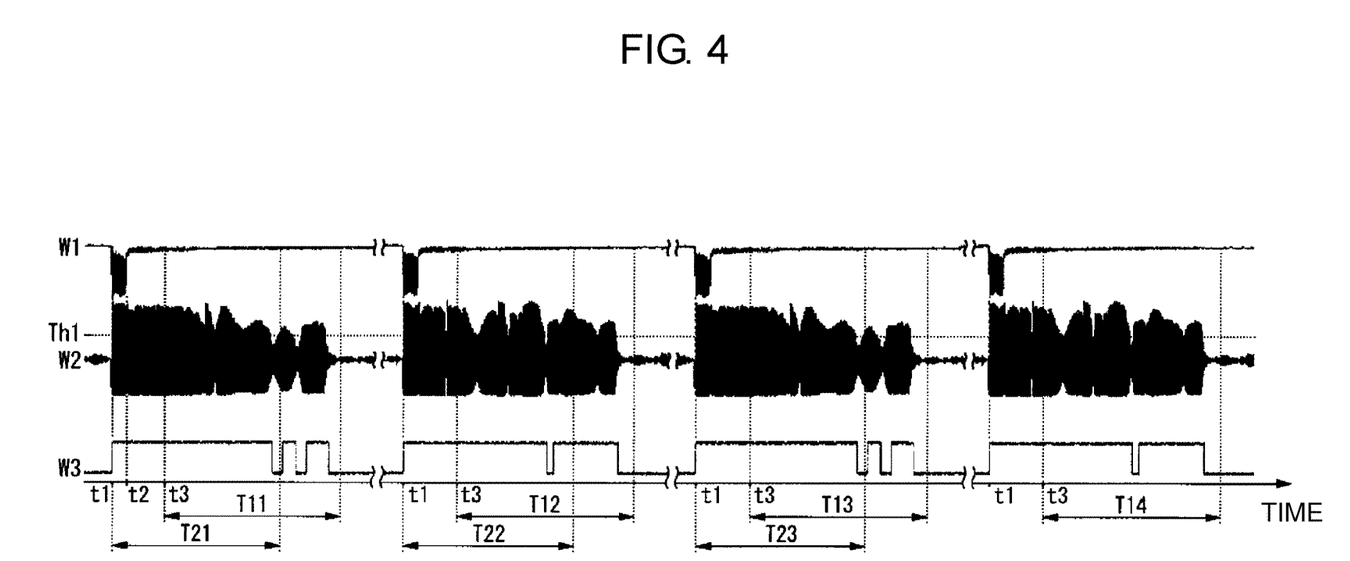
FIG. 4 is a waveform chart illustrating operation of a detector of the object detecting device.

In the exemplary embodiment, as illustrated in FIG. 4, detector 13 is configured to determine that object 2 is present in the case that reflected wave 200 is successively received in a plurality (four in this case) of detecting sections T11, T12, T13, T14. For example, when detector 13 is configured to detect the presence or absence of object 2 only in detecting section T11, possibly detector 13 falsely detects that object 2 is present due to a single acoustic noise. On the other hand, there is a low possibility that a noise is successively detected in the plurality of detecting sections T11, T12, T13, T14, and the false detection can be prevented or reduced as compared with the case that object 2 is detected only in detecting section T11. In the example of FIG. 4, detector 13 determines that object 2 is located in the short distance because reflected wave 200 is received in the section (that is, short-distance section) starting at time t3 in each of detecting sections T11, T12, T13, T14.

Figure 5:
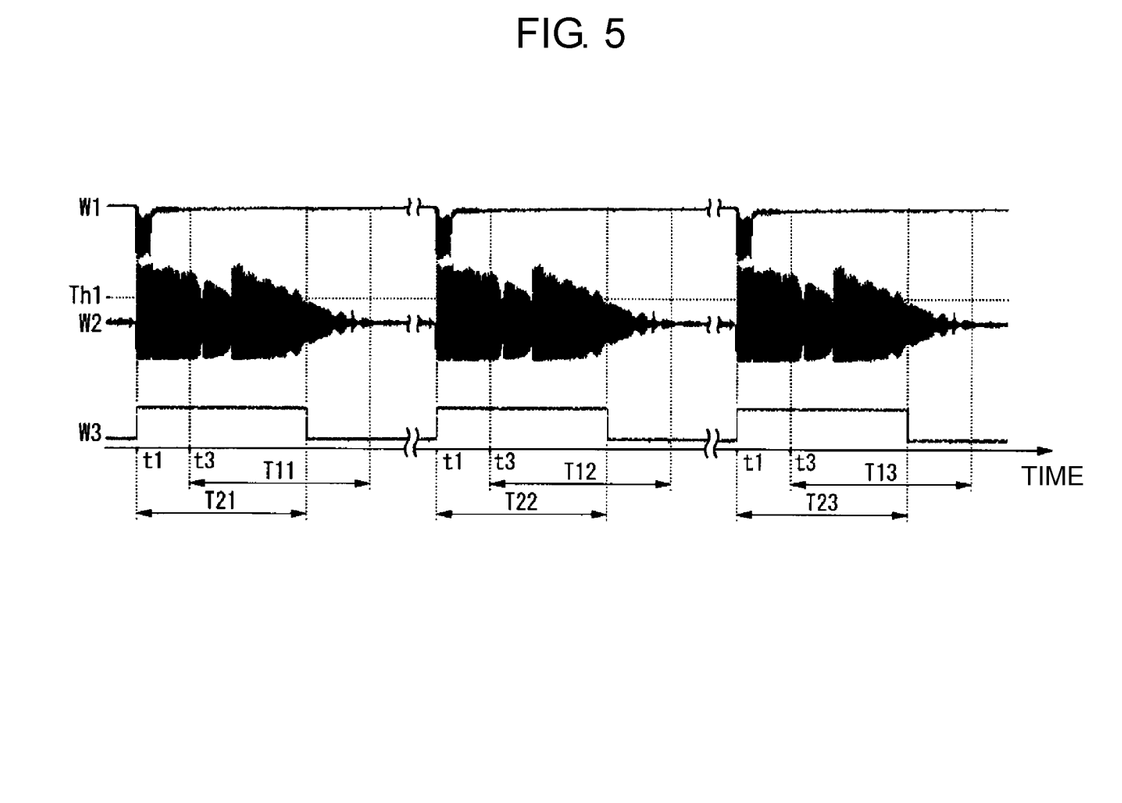
FIG. 5 is a waveform chart illustrating the operation of a determination unit of the object detecting device.

In the case that the vehicle equipped with object detecting device 1 of the exemplary embodiment is used in a cold district, metal bumper 10 has a possibility that ice adheres across ultrasonic transducer 31 and bezel 34 (see regions A1, A2 in FIG. 2A). In this case, ultrasonic transducer 31 vibrates together with bezel 34, and the reverberation is lengthened to detect the similar vibration waveform in each of detecting sections T11, T12, T13, T14 (T14 is not illustrated) as illustrated in FIG. 5. That is, normal ultrasonic wave 100 can hardly be generated in the configuration in which ultrasonic transducer 31 and bezel 34 vibrate integrally. In this case, detector 13 determines that reflected wave 200 is received in the short-distance sections of detecting sections T11, T12, T13, T14, and determines that object 2 is detected in the short distance. That is, detector 13 can hardly distinguish the case that object 2 is detected in the short distance from the case that a defect is generated in ultrasonic sensor 3. In other words, detector 13 can hardly distinguish the case that object 2 is detected in the short distance from the case that transmitting unit 11 is abnormal.

For this reason, in object detecting device 1 of the exemplary embodiment, determination unit 14 is provided such that the case that object 2 is detected in the short distance can be distinguished from the case that transmitting unit 11 is abnormal. Determination operation of determination unit 14 will be described below with reference to FIG. 5. The exemplary embodiment pays attention to a fact that the same waveform is output during the abnormality of transmitting unit 11 irrespective of the presence or absence of object 2.

A plurality (three in this case) of determination sections T21, T22, T23 in each of which time t1 transmitting unit 11 starts the transmission of ultrasonic wave 100 is set to a starting point are set in determination unit 14. Determination unit 14 determines whether transmitting unit 11 is abnormal based on the plurality of output waveforms W2 detected in determination sections T21, T22, T23. For example, each of determination sections T21, T22, T23 is set to 2.5 [ms].

Determination unit 14 determines whether transmitting unit 11 is abnormal based on whether the plurality of output waveforms W2 detected in the plurality of determination sections T21, T22, T23 are identical to one another. At this point, determination unit 14 compares the correlation value of the plurality of output waveforms W2 to a predetermined specified value. Determination unit 14 determines that transmitting unit 11 is abnormal when the correlation value is greater than or equal to the specified value (for example, 0.8). Determination unit 14 determines that transmitting unit 11 is normal when the correlation value is less than the specified value. As illustrated in FIG. 3A, determination unit 14 determines that transmitting unit 11 is normal when reflected wave 200 is not received.

In the exemplary embodiment, determination unit 14 compares the correlation value to the specified value by comparing the amplitude of output waveform W2 of receiving unit 12 to reference value Th1. For example, when transmitting unit 11 is abnormal, because the substantially same waveform is detected in the plurality of determination sections T21, T22, T23 as illustrated in FIG. 5, the correlation value becomes greater than or equal to the specified value, and determination unit 14 determines that transmitting unit 11 is abnormal. That is, determination unit 14 determines that the correlation value is greater than or equal to the specified value when the amplitude of output waveform W2 is greater than or equal to reference value Th1 over a whole of the plurality of determination sections T21, T22, T23, namely, when digital waveform W3 is high over the whole of the plurality of determination sections T21, T22, T23.

On the other hand, when transmitting unit 11 is normal, and when reflected wave 200 is received from object 2 located in the short distance, the waveforms detected in the plurality of determination sections T21, T22, T23 vary as illustrated in FIG. 4, and determination unit 14 determines that transmitting unit 11 is normal. That is, determination unit 14 determines that the correlation value is less than the specified value when the amplitude of output waveform W2 is less than reference value Th1 in one of the plurality of determination sections T21, T22, T23, namely, when digital waveform W3 is low in one of the plurality of determination sections T21, T22, T23. In the example of FIG. 4, digital waveform W3 is low in all determination sections T21, T22, T23, so that determination unit 14 determines that transmitting unit 11 is normal.

In this way, object detecting device 1 of the exemplary embodiment can detect the abnormality of transmitting unit 11.

Figure 6:
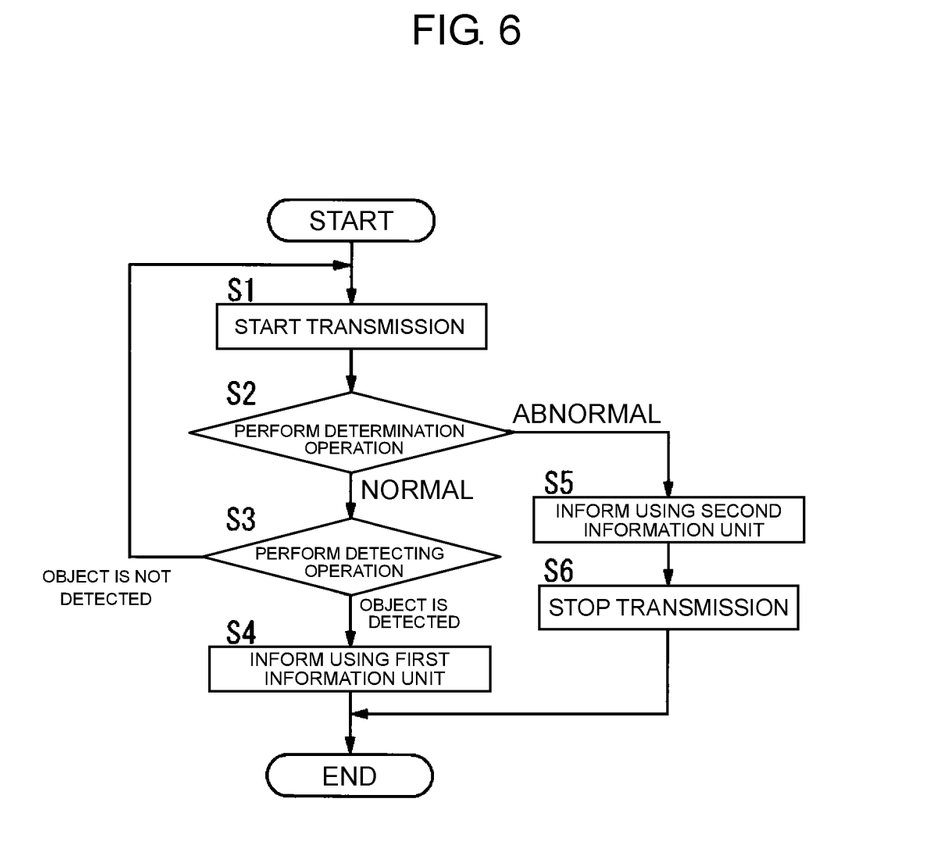
FIG. 6 is a flowchart illustrating the operation of the object detecting device.

Operation of object detecting device 1 of the exemplary embodiment will be described below with reference to a flowchart in FIG. 6. The determination operation of determination unit 14 and the detecting operation of detector 13 are already described, so that the description is omitted here.

Detector 13 outputs the transmission starting command starting the transmission of ultrasonic wave 100 to driving unit 17. Driving unit 17 causes transmitting unit 11 to start the transmission of ultrasonic wave 100 according to the transmission starting command (step S1). When the transmission of ultrasonic wave 100 is started, determination unit 14 performs the determination operation based on digital waveform W3 in which the A/D conversion is performed on output waveform W2 of receiving unit 12 (step S2). That is, determination unit 14 determines whether transmitting unit 11 is abnormal in step S2. When determination unit 14 determines that transmitting unit 11 is normal in step S2, detector 13 performs the detecting operation (step S3). On the other hand, when determining that transmitting unit 11 is abnormal in step S2, determination unit 14 outputs an information signal instructing the information to second information unit 16. Second information unit 16 informs according to the information signal (step S5). In the exemplary embodiment, second information unit 16 turns on a lamp and continuously rings a buzzer according to the information signal. Then, detector 13 outputs the transmission stopping command stopping the transmission of ultrasonic wave 100 to driving unit 17. Driving unit 17 causes transmitting unit 11 to stop the transmission of ultrasonic wave 100 according to the transmission stopping command (step S6).

When determination unit 14 determines that transmitting unit 11 is normal in step S2, detector 13 performs the detecting operation (step S3). When object 2 is not detected in step S3, detector 13 goes to step S1 to repeat the operation from step S1. On the other hand, when object 2 is detected in step S3, detector 13 outputs the information signal instructing the information to first information unit 15. First information unit 15 informs according to the information signal (step S4). For example, when object 2 is detected in the short distance, first information unit 15 turns on the lamp at intervals of one second and rings the buzzer at intervals of one second according to the information signal. For example, when object 2 is detected in the long distance, first information unit 15 turns on the lamp at intervals of three seconds and rings the buzzer at intervals of three seconds according to the information signal.

As described above, when transmitting unit 11 is abnormal, object detecting device 1 of the exemplary embodiment turns on the lamp and continuously rings the buzzer, so that the driver (or the passenger) of the vehicle can learn the abnormality of transmitting unit 11. When transmitting unit 11 is normal, the detection of object 2 changes the interval of blinking the lamp according to the distance to object 2 and the interval of ringing the buzzer, so that the driver (or the passenger) of the vehicle can learn the distance to object 2.

Determination unit 14 can regularly repeat determination sections T21 to T23 unless transmitting unit 11 stops the transmission of ultrasonic wave 100 after the determination that transmitting unit 11 is abnormal. In this case, determination unit 14 preferably cancels the determination that transmitting unit 11 is abnormal when the correlation value is less than the specified value in two adjacent determination sections of the plurality of determination sections T21, T22, T23. For example, in the case that transmitting unit 11 becomes normal due to melting of the ice fixing ultrasonic transducer 31 and bezel 34 to each other, the determination that transmitting unit 11 is abnormal is automatically canceled, so it is advantageous that necessity of canceling operation performed by the driver or the passenger is eliminated.

In object detecting device 1 of the exemplary embodiment, detector 13 detects the presence or absence of object 2 and the distance to object 2 based on digital waveforms W3 of four detecting sections T11, T12, T13, T14. On the other hand, determination unit 14 determines whether transmitting unit 11 is abnormal based on digital waveforms W3 of three determination sections T21, T22, T23. That is, in object detecting device 1 of the exemplary embodiment, a number of determination times of determination unit 14 is lower than a number of detecting times of detector 13. According to this configuration, whether transmitting unit 11 is abnormality is determined before the presence or absence or object 2 is detected, so that the false information due to the false detection of detector 13 can be prevented.

Determination sections T21, T22, T23 may be set within a predetermined time from the starting time point of the transmission of ultrasonic wave 100. Consequently, the starting points of determination sections T21, T22, T23 are not limited to the starting time point of the transmission of ultrasonic wave 100, but may be a time point when a specified time elapses from the ending time point of the transmission of ultrasonic wave 100. In this case, determination sections T21, T22, T23 are preferably set so as to overlap at least a part of the reverberation time (the time from t2 to time t3). According to this configuration, detection omission of reflected wave 200 that should originally be detected can be prevented.

In the exemplary embodiment, the term "greater than or equal to" in the comparison of the correlation value of the plurality of output waveforms W2 to the specified value and the comparison of the amplitude of each output waveform W2 to the reference value means both the case that the two values are equal to each other and the case that one of the two values is greater than the other. However, the term "greater than or equal to" may be the same meaning as the term "greater than" including only the case that one of the two values is greater than the other. That is, whether the case that the two values are equal to each other is included can be changed in any manner according to the settings of the specified value and the reference value, so that the term "greater than or equal to" and the term "greater than" are not technically different from each other. Similarly, the term "less than or equal to" may be the same meaning as the term "less than".

In the exemplary embodiment, detecting sections T11, T12, T13 and determination sections T21, T22, T23 are set so as to partially overlap each other. Alternatively, detecting sections T11, T12, T13 and determination section T21, T22, T23 may be set so as to wholly overlap each other. That is, detecting section T11, T12, T13 and determination section T21, T22, T23 may be set so as to be completely matched with each other.

In the exemplary embodiment, only transmitting unit 11, receiving unit 12, and driving unit 17 are provided in ultrasonic sensor 3. Alternatively, detector 13, determination unit 14, first information unit 15, and second information unit 16 may also be provided in ultrasonic sensor 3. In this case, at least a part of or all of detector 13, determination unit 14, first information unit 15, and second information unit 16 may be provided in ultrasonic sensor 3.

As described above, in object detecting device 1 of the exemplary embodiment, whether transmitting unit 11 is abnormal is determined based on the difference between the correlation value of the plurality of output waveforms (the waveform of the electric signal) W2 detected in the plurality of determination sections T21, T22, T23 and the specified value. Consequently, object detecting device 1 of the exemplary embodiment can detect the abnormality of transmitting unit 11.

Preferably object detecting device 1 of the exemplary embodiment further includes second information unit (information unit) 16 that informs the user about the abnormality of transmitting unit 11 based on the determination result of determination unit 14. According to this configuration, second information unit 16 informs the user about the abnormality of transmitting unit 11, so that the user can learn the abnormality of transmitting unit 11. However, this configuration is not essential to object detecting device 1, but the information unit may be eliminated.

Like object detecting device 1 of the exemplary embodiment, determination unit 14 preferably compares the amplitude of output waveform W2 to reference value Th1 in each of the plurality of determination sections T21, T22, T23. In this case, determination unit 14 determines that the correlation value is greater than or equal to the specified value in the case that the amplitude of output waveform W2 is greater than or equal to reference value Th1 over the whole of the plurality of determination sections T21, T22, T23. According to this configuration, whether transmitting unit 11 is abnormal is determined based on the difference between the correlation value of the plurality of output waveforms W2 in the plurality of determination sections T21, T22, T23 and the specified value, and the false determination due to the noise can be prevented. However, this configuration is not essential to object detecting device 1, but determination unit 14 may be configured to determine whether transmitting unit 11 is abnormal based on whether, for example, the plurality of output waveforms W2 are matched with each other by pattern matching. For example, determination unit 14 may be configured to determine whether transmitting unit 11 is abnormal based on whether, assuming that initially detected output waveform W2 is a reference waveform, output waveforms W2 detected at second and third times are matched with the reference waveform. The matching of the waveform includes not only the case the waveforms are completely matched with each other but also the case that a difference between the waveforms falls within a specified value.

Like object detecting device 1 of the exemplary embodiment, determination unit 14 preferably causes transmitting unit 11 to stop the transmission of ultrasonic wave 100 when the determination that transmitting unit 11 is abnormal is made. According to this configuration, the operation to detect object 2 is stopped until the determination that transmitting unit 11 is abnormal is canceled, so that the false detection of object 2 can be prevented. However, this configuration is not essential to object detecting device 1, but transmitting unit 11 may be configured to continuously transmit ultrasonic wave 100.

Like object detecting device 1 of the exemplary embodiment, determination unit 14 preferably cancels the determination that transmitting unit 11 is abnormal when a first condition is satisfied during the determination that transmitting unit 11 is abnormal. The first condition is a condition that the correlation value in the two adjacent determination sections of the plurality of determination sections T21, T22, T23 is less than the specified value. According to this configuration, the determination that transmitting unit 11 is abnormal can be canceled even if the user does not perform canceling operation. However, this configuration is not essential to object detecting device 1, but the determination that transmitting unit 11 is abnormal may be canceled by the canceling operation of the user.

Like object detecting device 1 of the exemplary embodiment, detector 13 preferably determines that object 2 is present when successively receiving reflected wave 200 in the plurality of detecting sections T11, T12, T13, T14 larger than the plurality of determination sections T21, T22, T23. According to this configuration, the presence or absence of object 2 is detected after whether transmitting unit 11 is abnormal is determined, so that the false detection of object 2 due to the abnormality of transmitting unit 11 can be prevented. However, this configuration is not essential to object detecting device 1, but, for example, the number of determination sections may be equal to the number of detecting sections.

Like object detecting device 1 of the exemplary embodiment, preferably the starting point of each of the plurality of determination sections T21, T22, T23 is a time point when a specified time elapses from the ending point of the transmission of ultrasonic wave 100. According to this configuration, for example, in the case that determination sections T21, T22, T23 are set so as to overlap the reverberation time of ultrasonic wave 100, the detection omission of reflected wave 200 that should originally be detected can be prevented. However, this configuration is not essential to object detecting device 1, but, for example, the time point when the transmission of ultrasonic wave 100 is started may be set to the starting point of each of the plurality of determination sections T21, T22, T23.

INDUSTRIAL APPLICABILITY

The object detecting device of the present invention is applicable to a transmitter mounted on a vehicle.

REFERENCE MARKS IN THE DRAWINGS

1: object detecting device
2: object
3: ultrasonic sensor
10: bumper
11: transmitting unit
12: receiving unit
13: detector
14: determination unit
15: first information unit
16: second information unit
17: driving unit
31: ultrasonic transducer
32: circuit board
33: housing
34: bezel
35: buffering rubber
36: connection terminal
100: ultrasonic wave
101: through-hole
200: reflected wave
310: case
311: piezoelectric element
312: connection terminal
330: enclosure
330a: through-hole
331: enclosure
332: enclosure 340: main body
341: flange
342: protrusion
350: main body
350a: through-hole
351: protrusion
T11, T12, T13, T14: detecting section
T21, T22, T23: determination section
Th1: reference value
W2: output waveform

The invention claimed is:

1. An object detecting device comprising:
a detector that detects presence or absence of an object based on whether a receiving unit that converts a mechanical vibration into an electric signal receives a reflected ultrasonic wave transmitted intermittently from a transmitting unit; and
a determination unit that determines that the transmitting unit is normal when the electric signal of the reflected ultrasonic wave is not detected in a plurality of determination sections each of which is set within a predetermined time from a starting time point of the transmission of the ultrasonic wave, the determination unit determining that the transmitting unit is abnormal when a correlation value of waveforms of a plurality of the electric signals detected in each of the plurality of determination sections is greater than or equal to a specified value, the determination unit determining that the transmitting unit is normal when the correlation value is less than the specified value,
wherein the determination unit compares an amplitude of the electric signal to a reference value in each of the plurality of determination sections, and determines that the correlation value is greater than or equal to the specified value when the amplitude is greater than or equal to the reference value over a whole of the plurality of determination sections.

2. The object detecting device according to claim 1, further comprising an information unit that presents information about abnormality of the transmitting unit based on a determination result of the determination unit.

3. The object detecting device according to claim 1, wherein the determination unit causes the transmitting unit to stop the transmission of the ultrasonic wave when the determination unit determines that the transmitting unit is abnormal.

4. The object detecting device according to claim 1, wherein the determination unit cancels the determination that the transmitting unit is abnormal when the correlation value is less than the specified value in two adjacent determination sections of the plurality of determination sections while the determination unit determines that the transmitting unit is abnormal.

5. The object detecting device according to claim 1, wherein the detector determines that the object is present when the reflected wave is successively received in a plurality of detecting sections in which a time point when a reverberation is ended is set to a starting point, the plurality of detecting sections being more than the plurality of determination sections.

6. The object detecting device according to claim 1, wherein the starting point of each of the plurality of determination sections is a time point when a specified time elapses from an ending point of the transmission of the ultrasonic wave.

7. An object detecting device, comprising:
a processor; and
a memory including a program that, when executed by the processor, causes the processor to perform operations including:
detecting presence or absence of an object based on whether a piezoelectric element, that converts a mechanical vibration into an electric signal, receives a reflected ultrasonic wave transmitted intermittently in the piezoelectric element; and
determining that the piezoelectric element is normal when the electric signal of the reflected ultrasonic wave is not detected in a plurality of determination sections each of which is set within a predetermined time from a starting time point of the transmission of the ultrasonic wave, the processor determining that the piezoelectric element is abnormal when a correlation value of waveforms of a plurality of the electric signals detected in each of the plurality of determination sections is greater than or equal to a specified value, the processor determining that the piezoelectric element is normal when the correlation value is less than the specified value,
wherein the processor compares an amplitude of the electric signal to a reference value in each of the plurality of determination sections, and determines that the correlation value is greater than or equal to the specified value when the amplitude is greater than or equal to the reference value over a whole of the plurality of determination sections.

8. An object detecting device, comprising:
an electronic control unit; and
a piezoelectric element,
wherein the electronic control unit detects presence or absence of an object based on whether the piezoelectric element, that converts a mechanical vibration into an electric signal, receives a reflected ultrasonic wave transmitted intermittently in the piezoelectric element,
the electronic control unit determines that the piezoelectric element is normal when the electric signal of the reflected ultrasonic wave is not detected in a plurality of determination sections each of which is set within a predetermined time from a starting time point of the transmission of the ultrasonic wave, the electronic control unit determining that the piezoelectric element is abnormal when a correlation value of waveforms of a plurality of the electric signals detected in each of the plurality of determination sections is greater than or equal to a specified value, the electronic control unit determining that the piezoelectric element is normal when the correlation value is less than the specified value, and
the electronic control unit compares an amplitude of the electric signal to a reference value in each of the plurality of determination sections, and determines that the correlation value is greater than or equal to the specified value when the amplitude is greater than or equal to the reference value over a whole of the plurality of determination sections.

* * * * *